United States Patent
Yamamoto et al.

(10) Patent No.: US 10,928,112 B2
(45) Date of Patent: Feb. 23, 2021

(54) HEAT PUMP DEVICE

(71) Applicant: TOSHIBA CARRIER CORPORATION, Kanagawa (JP)

(72) Inventors: Kenta Yamamoto, Shizuoka (JP); Yuji Katoh, Shizuoka (JP); Masaki Kanamori, Shizuoka (JP)

(73) Assignee: Toshiba Carrier Corporation, Kawasaki (JP)

(*) Notice: Subject to any disclaimer, the term of this patent is extended or adjusted under 35 U.S.C. 154(b) by 358 days.

(21) Appl. No.: 16/088,044

(22) PCT Filed: Sep. 2, 2016

(86) PCT No.: PCT/JP2016/075784
§ 371 (c)(1),
(2) Date: Sep. 24, 2018

(87) PCT Pub. No.: WO2017/163451
PCT Pub. Date: Sep. 28, 2017

(65) Prior Publication Data
US 2020/0300521 A1     Sep. 24, 2020

(30) Foreign Application Priority Data
Mar. 25, 2016  (JP) .............................. JP2016-062050

(51) Int. Cl.
| | | |
|---|---|---|
| *F25B 49/02* | (2006.01) | |
| *F25B 13/00* | (2006.01) | |
| *H02M 5/458* | (2006.01) | |
| *H02P 27/04* | (2016.01) | |

(52) U.S. Cl.
CPC .............. *F25B 49/02* (2013.01); *F25B 13/00* (2013.01); *H02M 5/458* (2013.01); *H02P 27/04* (2013.01)

(58) Field of Classification Search
CPC ............ F24F 11/89; F25B 13/00; F25B 49/02
See application file for complete search history.

(56) References Cited

U.S. PATENT DOCUMENTS

| | | | |
|---|---|---|---|
| 2009/0228147 A1* | 9/2009 | Lim ........................ | F24F 11/30 700/275 |
| 2015/0354870 A1* | 12/2015 | Lee ..................... | H02M 1/4225 62/498 |
| 2015/0354881 A1* | 12/2015 | Park ...................... | F25B 49/025 62/228.1 |

FOREIGN PATENT DOCUMENTS

| | | |
|---|---|---|
| JP | 09-074765 | 3/1997 |
| JP | H09-93813 | * 4/1997 |
| JP | 2002-315355 | 10/2002 |
| JP | 2009-275928 | 11/2009 |

(Continued)

*Primary Examiner* — Henry T Crenshaw
(74) *Attorney, Agent, or Firm* — DLA Piper LLP US

(57) ABSTRACT

A heat pump device is equipped with a compressor for compressing a refrigerant; a converter for converting a voltage of an alternating current power supply into a boosted direct current; an inverter for converting the direct current output of the converter into an alternating current, supplying the alternating current to the compressor; a voltage detector for detecting an input voltage to the converter; a stop controller for stopping operation of the converter and the inverter when resonance occurs in the voltage detected by the voltage detector; a limit controller for sending an instruction to limit an input current to the converter so as to avoid the resonance; and a manually operable input interface for sending an instruction to cause the limit control unit to operate.

7 Claims, 8 Drawing Sheets

(56) References Cited

FOREIGN PATENT DOCUMENTS

| JP | 2014-220954 | 11/2014 |
| JP | 2016-027774 | 2/2016 |
| WO | WO 2016/136634 | 9/2016 |

* cited by examiner

HEAT PUMP DEVICE

CROSS REFERENCE TO RELATED APPLICATIONS

This application is a U.S. National Stage Application of International Application No. PCT/JP2016/075784 filed Sep. 2, 2016 which claims priority from Japanese Patent Application No. 2016-062050 filed Mar. 25, 2016.

FIELD

Embodiments of the present invention relate to a heat pump device equipped with a refrigeration cycle using a compressor.

BACKGROUND

There is known a heat pump device in which a direct current (DC) voltage boosted to a desired voltage is supplied from a converter connected to a three-phase alternating current (AC) power source serving as a system power supply to an inverter and the inverter drives a motor of a compressor of the heat pump device at variable speed.

In the converter and the inverter of such a heat pump device, switching elements provided in the current path are switched (ON/OFF) at a high frequency. Here, the converter performs feedback control to adjust the switching of the switching element, i.e., the ON/OFF timing and its span such that the output voltage becomes a desired target voltage. Similarly, the inverter performs feedback-control on the switching of the switching element such that the rotation speed of the compressor matches the target value. In these switching circuits, a harmonic current is generated by the switching of the switching element.

Harmonics generated in equipment that is the load of the system power supply may cause resonance on the system power supply side depending on the impedance state of the system power supply. For this reason, there is known a system-power-supply resonance-suppression device configured to detect occurrence of resonance in the system power supply and output a turn-on/turn-off signal to a switch, which turns on/off a phase advancing capacitor for suppressing reactive power, for suppressing the resonance.

This system-power-supply resonance-suppression device captures a harmonic voltage and a harmonic current and shifts the resonance frequency with the phase advancing capacitor for suppressing reactive power. The phase advancing capacitor for suppressing reactive power includes three types of capacitors having capacities different from each other. The phase advancing capacitor for suppressing reactive power combines these three types of capacitors so as to stepwisely change the capacity of the entirety of the phase advancing capacitor. As a result, the conventional system-power-supply resonance-suppression device changes the impedance of the current path and prevents occurrence of resonance.

PRIOR ART DOCUMENT

Patent Document

Patent Document 1: Japanese Unexamined Patent Application Publication No. H09-93813

SUMMARY

Problems to be Solved by Invention

The above-described system-power-supply resonance-suppression device requires plural capacitors, which causes, for example, increase in number of components, increase in installation space, and increase in cost.

Additionally, when the capacitance of the phase advancing capacitor is changed in the conventional system-power-supply resonance-suppression device, at least one capacitor is separated from the system. The capacitor disconnected from the system will only be the extra component, which occupies extra space and results in extra cost, unless the connection with the system is restored.

Accordingly, embodiments of the present invention provides a heat pump device that can avoid resonance of the power supply by reducing increase in number of component, installation space, and cost.

Means for Solving Problem

To achieve the above object, an aspect of an embodiments of the present invention provides a heat pump device including: a compressor configured to compress a refrigerant; a converter configured to convert a voltage of an alternating current power supply into a direct current voltage boosted by switching; an inverter configured to convert the direct current output of the converter into an alternating current power supply and supply the alternating current power supply to the compressor; a voltage detector configured to detect an input voltage of the converter; a stop controller configured to stop operation of the converter and the inverter when resonance occurs in the input voltage detected by the voltage detector; a limitation controller configured to send an instruction to limit an input current to the converter in such a manner that resonance is avoided; and an input interface configured to be manually operable and send an operational instruction to operate the limitation controller.

DETAILED DESCRIPTION

Figure 1:
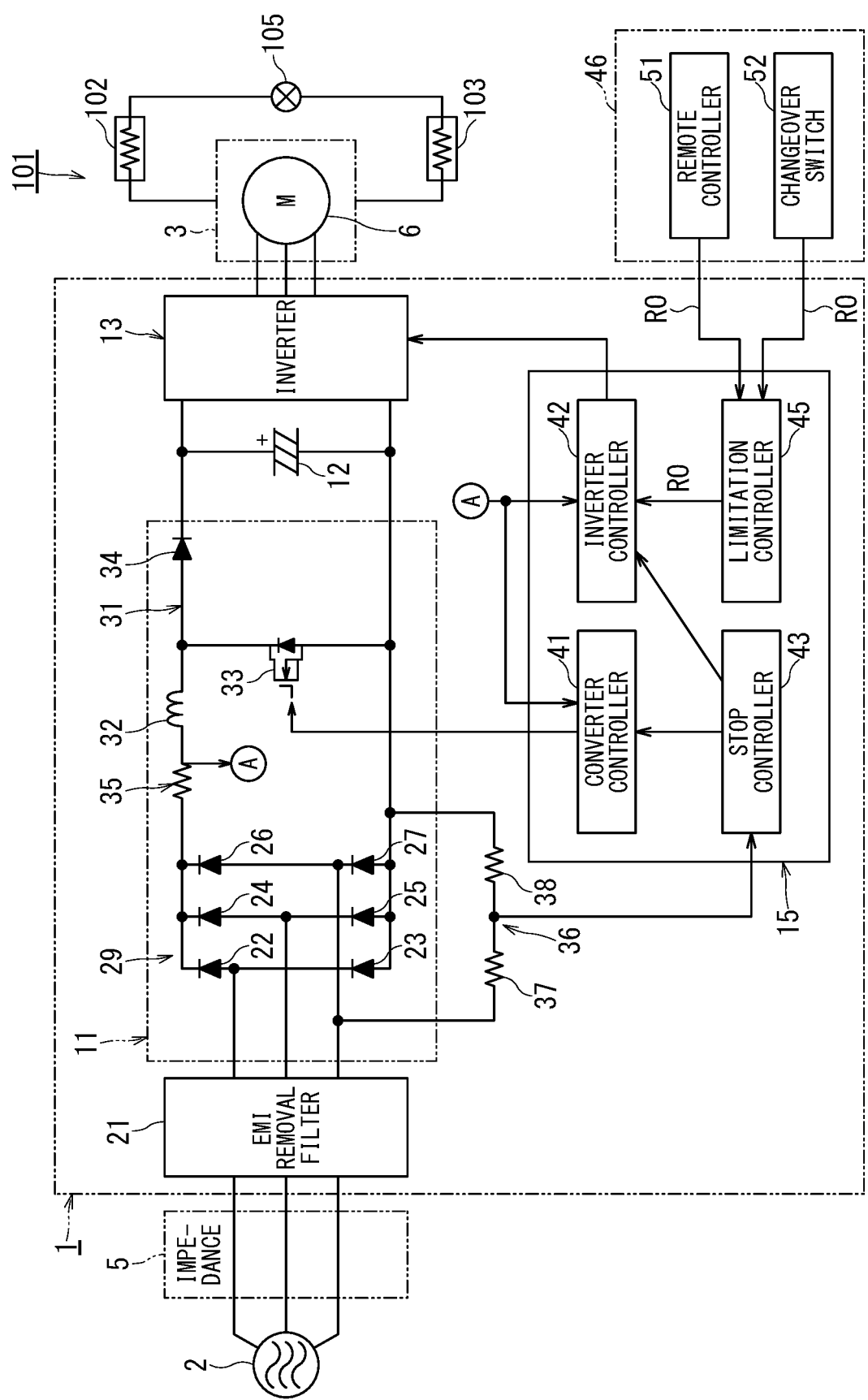
FIG. 1 is a circuit diagram and control block diagram of a heat pump device according to a first embodiment of the present invention.

Hereinafter, embodiments of heat pump devices according to the present invention will be described with reference to FIG. 1 to FIG. 8.

A heat pump device 101 according to the present embodiment includes a refrigeration cycle for cooling or both of cooling and heating. The refrigeration cycle includes a heat exchanger 102 configured to absorb heat, a heat exchanger 103 configured to dissipate heat, an expansion device 105 provided between both of the heat exchangers 102 and 103, and a compressor 3 configured to circulate a refrigerant through the heat exchangers 102, 103 and the expansion device 105. The compressor 3 is driven by a DC brushless motor 6.

First Embodiment

The heat pump device according to a first embodiment of the present invention will be described with reference to FIG. 1 to FIG. 6.

FIG. 1 is a circuit diagram and control block diagram for illustrating a circuit that drives the compressor of the heat pump device according to the first embodiment of the present invention.

As shown in FIG. 1, the driving device 1 according to the present embodiment includes a direct current (DC) brushless motor 6 (hereinafter referred to as "motor 6" or "DC motor 6") for rotating a compression mechanism in the compressor 3 of the heat pump device. The driving device 1 converts the voltage of the alternating current (AC) power supply 2 into a DC voltage, converts this DC voltage into an AC voltage of a predetermined frequency, and then outputs the converted AC voltage as the driving power of the motor 6.

The AC power supply 2 is a commercial three-phase AC power supply. An impedance 5 (hereinafter referred to as "power supply impedance 5") exists in the AC power supply 2. The power supply impedance 5 differs depending on, for example, the area, place, and connected equipment.

The motor 6 includes a non-illustrated stator (i.e., armature) equipped with plural non-illustrated phase windings Lu, Lv, Lw, and a non-illustrated rotor in which plural, e.g., four-pole permanent magnets are buried. The rotor rotates by the interaction between the magnetic field generated by the current flowing through the phase windings Lu, Lv, Lw and the magnetic field generated by the permanent magnets of the stator.

The driving device 1 includes a converter 11, a smoothing capacitor 12, an inverter 13, and a controller 15 (MCU: Micro Control Unit) as a control unit.

The converter 11 converts the voltage of the AC power source 2 into a DC voltage that is boosted by switching. The converter 11 may perform one of boosting the output voltage, improving the power factor, and reducing the high frequency. The converter 11 is, e.g., a chopper-type boost converter or a Pulse Width Modulation (PWM) converter. The converter 11 according to the present embodiment is a boost converter of a chopper circuit.

The converter 11 includes an Electro Magnetic Interference (EMI) removal filter 21, a rectifier circuit 29 equipped with diodes 22 to 27 connected to the AC power supply 2 via the EMI removal filter 21, and a boost chopper circuit 31 connected to the rectifier circuit 29.

The converter 11 performs full-wave rectification on the output voltage of the AC power supply 2 with the rectifier circuit 29, and boosts the output voltage with the boost chopper circuit 31 so as to convert it into a DC voltage. The converter 11 can also stop the switching of the boost chopper circuit 31 and output a DC current subjected to the full-wave rectification with the rectifier circuit 29.

The rectifier circuit 29 includes a pair of diodes 22 and 23 connected in series with each other, a pair of diodes 24 and 25 connected in series with each other, and a pair of diodes 26 and 27 connected in series with each other, and is configured by connecting these three pairs in parallel. The three phases of the three-phase power of the AC power supply 2 are supplied to the corresponding connection points between the pair of diodes connected in series. In addition, the cathode side of the diode in each series connection is commonly connected to the positive-side output of the rectifier circuit 29, and the anode side in each series connection is commonly connected to the negative-side output of the rectifier circuit 29.

The boost chopper circuit 31 includes a reactor 32 connected to the output of the rectifier circuit 29 for accumulating the current, a switching element 33 for controlling charge/discharge (PWM control, i.e., Pulse Width Modulation) of the current accumulated in the reactor 32 according to the pulse width of the pulse signal outputted by the controller 15, and a reverse current blocking diode (i.e., chopper diode) 34 that allows current to flow to the output side and prevents the reverse current from the output side. The switching element 33 is, e.g., a Metal-Oxide-Semiconductor Field-Effect Transistor (MOSFET). It is sufficient that the switching element 33 is a self arc-extinguishing semiconductor element, and the switching element 33 may be, for example, an Insulated Gate Bipolar Transistor (IGBT), or a bipolar transistor.

The positive-side output of the rectifier circuit 29 is connected to one side of the reactor 32. The other side of the reactor 32, the drain side of the switching element 33, and the anode side of the reverse current blocking diode 34 are connected to each other. The negative-side output of the rectifier circuit 29 is connected to the source side of the switching element 33. A parasitic diode is connected in parallel to the switching element 33. When a MOSFET is used as the switching element 33, the parasitic diode functions as a reverse current blocking diode.

A smoothing capacitor 12 for smoothing the output of the converter 11 is connected between the cathode of the chopper diode 34 of the boost chopper circuit 31 and the negative-side output of the rectifier circuit 29.

The inverter 13 converts the output voltage of the converter 11 into an AC voltage, and supplies this AC voltage to the motor 6. The inverter 13 converts the output voltage of the converter 11 (i.e., voltage of the smoothing capacitor 12) into a three-phase AC voltage of a predetermined frequency, and outputs it. The output frequency of the inverter 13 is instructed from a non-illustrated controller of the heat pump device 101 provided as a superordinate unit according to the heat load on the refrigeration cycle side.

The output of the inverter 13 is connected to the phase windings Lu, Lv, Lw of the motor 6.

A current detector 35 is provided in the current path between the positive-side output of the rectifier circuit 29 and the reactor 32 of the boost chopper circuit 31. The current detector 35 detects the output current of the rectifier circuit 29, and outputs a detection signal corresponding to this output current to the controller 15.

The current value (DC current I) detected by the current detector 35 is used for controlling the converter 11 and the inverter 13.

A voltage detector 36 is provided in parallel in any one of the three phases of the rectifier circuit 29 of the converter 11.

The voltage detector 36 detects a voltage inputted to the rectifier circuit 29 (i.e., detects an output voltage of the AC power supply 2, which is a voltage passing through the EMI removal filter 21), and outputs a detection signal corresponding to this input voltage to the controller 15.

The voltage detector 36 includes two or more series-connected resistors 37 and 38 that are connected in parallel to the rectifier circuit 29, and detects a voltage across one resistor among them by, for example, a differential amplifier, or an insulation amplifier. The voltage value detected by the voltage detector 36 is used for determining whether resonance occurs in the power supply voltage.

The voltage detector 36 may be provided in each of the three phases of the rectifier circuit 29, or in any two phases. Further, the voltage detector 36 may be provided at any part of the driving device 1 to such an extent that it can be determined whether resonance occurs in the voltage.

The controller 15 controls the operation of the converter 11 and the inverter 13. The controller 15 includes a converter controller 41 for controlling the converter 11, an inverter controller 42 for controlling the inverter 13, and a stop controller 43 for stopping the operation of the converter 11 and the inverter 13 when resonance occurs in the voltage detected by the voltage detector 36. In order not to exceed the rated values of various components, the controller 15 stores a predetermined current upper limit value Is or receives an instruction from the controller of the heat pump device provided as the superordinate unit. The controller 15 controls the converter 11 and the inverter 13 such that the current detected by the current detector 35 does not exceed the current upper limit value Is. The maximum capability (i.e., maximum load) of the heat pump device is such an operation that the current detected by the current detector 35 becomes substantially equal to the current upper limit value Is.

The controller 15 includes a limitation controller 45 that sends an instruction (i.e., limitation instruction RO) for limiting the input current to the converter 11 so as to avoid resonance of the voltage detected by the voltage detector 36, and an input interface 46 that can be manually operated to send an instruction (i.e., limitation instruction RO) for operating the limitation controller 45.

An instruction to turn on/off the drive device 1 is inputted to the controller 15 from the outside as an operation control instruction. This instruction is generally sent to the controller 15 from a controller of the superordinate-side equipment, e.g., the non-illustrated controller of the heat pump device.

The limitation instruction RO for limiting the input to the heat pump device to the limiting value Ir is inputted to the controller 15 in order to avoid resonance of the voltage detected by the voltage detector 36. The limitation instruction RO is sent from the input interface 46 to the controller 15. In other words, the controller 15 can receive the limitation instruction RO that limits the input current to the converter 11 for avoiding resonance of the voltage detected by the voltage detector 36 from the input interface 46. The controller 15 receives the limitation instruction RO sent from the input interface 46 with the limitation controller 45.

The input interface 46 is a remote controller 51 of the heat pump device equipped with plural operation buttons (not shown), and the limitation instruction RO is generated by a special operation with respect to the operation button(s) of the remote controller 51. The input interface 46 may be a changeover switch 52 provided in a controller that is housed inside the housing of the heat pump device and cannot be easily operated, and the limitation instruction RO may be caused by operation with respect to the changeover switch 52. The input interface 46 is one or both of these.

The special operation with respect to the remote controller 51 is different from an operation normally performed by a user, and is an act of operating plural switches (push buttons) of the remote controller 51 in a prescribed order or operating plural times in succession.

The limitation instruction RO is sent from the remote controller 51 and the changeover switch 52 to the inverter controller 42 via the limitation controller 45. The limitation instruction RO includes an instruction of the limiting value Ir. The limiting value Ir means the upper limit value of the output of the heat pump device. Specifically, the limiting value Ir may be previously set to be smaller than the maximum capability (i.e., maximum load) of the heat pump device, i.e., smaller than the maximum rotation speed of the compressor to the extent that resonance of the voltage can be avoided, e.g., 50% or 75% of the maximum load. Additionally or alternatively, the limiting value Ir may be set arbitrarily from the input interface 46 or may be selected by an alternative selection. The load of the heat pump device, the rotation speed of the compressor, and the input current value are almost proportional to each other. Thus, the limiting value Ir for limiting the upper limit of the input current supplied from the AC power supply to the heat pump device may be set to 75% of the current upper limit Is corresponding to the maximum load. The rotation speed of the compressor (i.e., the output frequency of the inverter 11) may be set to be limited to 50% or 75% of the maximum rotation speed. That is, under the condition where the current upper limit value Is is larger than the limiting value Ir (Is>Ir), the limiting value Ir is desirably as high as possible within a range of a value that is low enough to avoid voltage resonance.

The converter controller 41 performs PWM-control on the switching element 33 of the converter 11 such that the output voltage of the converter 11 becomes the target value, and thereby causes the converter 11 to perform a voltage boosting operation.

The inverter controller 42 controls the inverter 13 on the basis of the target rotation speed instruction of the compressor 3 instructed as the required capacity in the operation control instruction received from the controller of the heat pump device such that the motor 6 reaches the target rotation speed.

Further, when the inverter controller 42 receives the limitation instruction RO from the input interface 46, the inverter controller 42 changes the current upper limit value Is received from the controller of the heat pump device to the limiting value Ir and controls the output frequency of the inverter 13 such that the current value I detected by the current detector 35 becomes equal to or less than the limiting value Ir. The inverter controller 42 limits the input current to the converter 11 so as to avoid resonance by operating the inverter 13 within the range of the current upper limit Is (=limiting value Ir) changed to the limiting value Ir.

The stop controller 43 monitors the detection result of the voltage detector 36 so as to determine whether resonance occurs in the voltage. When resonance occurs in the voltage detected by the voltage detector 36, the stop controller 43 immediately stops the operation of the converter 11 and the inverter 13, and causes a non-illustrated display of the remote controller 51 and/or a non-illustrated display of the controller of the heat pump device to display that the operation of the converter 11 and the inverter 13 is stopped due to occurrence of resonance.

That is, a user of the heat pump device and/or a facility worker can know that the converter 11 and the inverter 13 are stopped by the stop controller 43 as a result of detecting the resonance by the display (display of abnormality) on the display.

Figure 2:
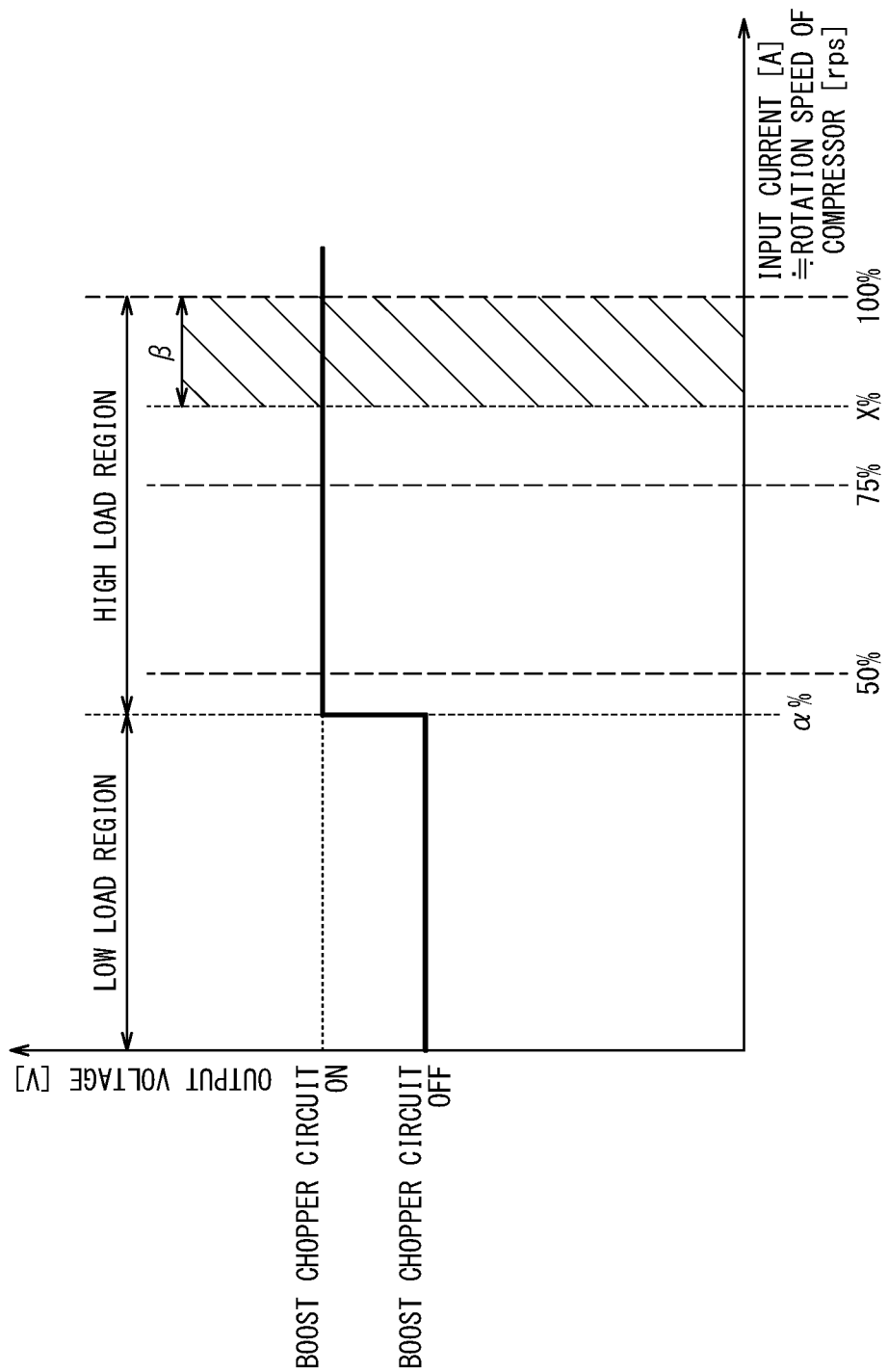
FIG. 2 is a diagram conceptually illustrating measures against resonance in the heat pump device according to the first embodiment of the present invention.

FIG. 2 is a diagram conceptually illustrating measures against resonance of the heat pump device according to the first embodiment of the present invention.

FIG. 2 is a diagram illustrating the relationship between the input current to the DC motor 6 of the heat pump device and the output voltage of the converter 11.

In the low load region where the input current (horizontal axis in FIG. 2) to the motor 6 is smaller than forty and several percent of the maximum load (input current=100%) of the motor 6 (boost-operation ON threshold value a in FIG. 2), the driving device 1 according to the present embodiment supplies the DC voltage subjected to full-wave rectification by the rectifier circuit 29 to the motor 6 under the state where the boost chopper circuit 31 of the converter 11 is kept OFF (stopped). The boost chopper circuit 31 is originally provided in order to prevent the motor 6 from reaching limit as the counter electromotive force of the motor 6 becomes large in a high rotation speed region and a sufficient current cannot be supplied from the inverter 11 to the motor 6 due to the increase in the counter electromotive force. Thus, boosting is unnecessary in the low rotation speed region (i.e., low load region) in which the motor 6 can be controlled to the target rotation speed without boosting. When boosting is performed, switching loss due to ON/OFF operation of the switching element 33 and power loss in the driving circuit occur. Hence, it is desirable from the viewpoint of energy saving to disable the boost chopper circuit 31 in the low rotation speed region (i.e., low load region). For these reasons, the boost chopper circuit 31 of the converter 11 is turned off in the low load region where the input current value or the rotation speed of the compressor is smaller than the boost operation ON threshold a as described above.

The driving device 1 turns on (operates) the boost chopper circuit 31 of the converter 11 in the high load region from forty and several percent of the maximum load of the motor 6 (boost-operation ON threshold a in FIG. 2) to the maximum load, and supplies the boosted DC voltage to the DC motor 6. As a result, the inverter 11 can drive the compressor 3 to the maximum load of the motor 6, i.e., the maximum rotation speed.

Resonance occurs in the voltage of the driving device 1 when the current flowing through the converter 11 is large. In particular, in the high load region in which the boost chopper circuit 31 of the converter 11 performs the boosting operation, a problematic large voltage resonance occurs in the region β which is on the high load side of the high load region and is higher in load than X % (e.g., 80%>α).

Thus, when resonance occurs in the voltage, the driving device 1 temporarily stops the operation of the converter 11 and the inverter 13, limits the input current to the heat pump device on the basis of the external instruction (limitation instruction RO) to avoid subsequent resonance. The limiting value Ir may be smaller than X % in the high load region, e.g., about 75% or 50% of the rated load.

Figure 3:
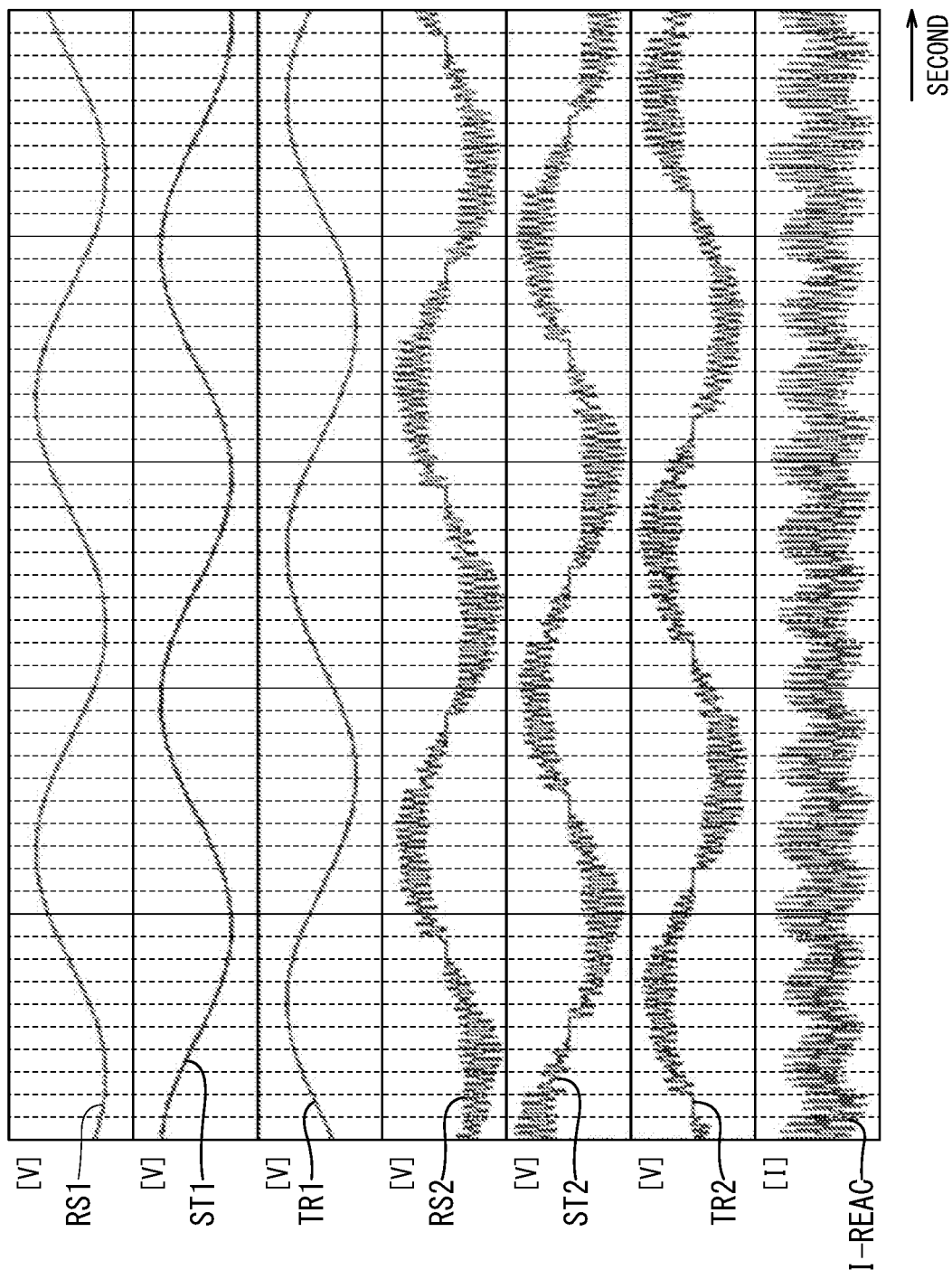
FIG. 3 is a waveform diagram illustrating a state in which resonance occurs in a power supply voltage of the heat pump device according to the first embodiment of the present invention.

FIG. 3 is a waveform diagram illustrating a state in which resonance occurs in the power supply voltage of the heat pump device according to the first embodiment of the present invention.

In FIG. 3, RS1 indicates a line voltage between a first phase and a second phase on the side of the AC power source 2, ST1 indicates a line voltage between the second phase and a third phase on the side of the AC power source 2, and TR1 indicates the line voltage between the third phase and the first phase on the side of the AC power supply 2.

In FIG. 3, RS2 indicates a line voltage between a first phase and a second phase on the side of the driving device 1, ST2 indicates a line voltage between the second phase and a third phase on the side of the driving device 1, and TR2 indicates a line voltage between the third phase and the first phase on the side of the driving device 1.

RS1, ST1, TR1, RS2, ST2, and TR2 are described on the basis of the vertical axis of the same scale.

Further, I-REAC in FIG. 3 shows the current flowing through the reactor 32 of the converter 11.

The line voltages RS1, ST1, and TR1 on the side of the AC power supply 2 are the detection results on the side of the AC power supply 2 than the power supply impedance 5. The line voltages RS2, ST2, and TR2 on the side of the driving device 1 are the detection results on the side of the driving device 1 than the power supply impedance 5.

As shown in FIG. 3, when resonance occurs in the voltage, the peak value of the heat pump device according to the present embodiment is increased at RS2, ST2, and TR2 on the side of the driving device 1 as compared with RS1, ST1, and TR1 on the side of the AC power supply 2. Although FIG. 3 is only one case, the peak value has expanded to about twice. For instance, when the voltage of the AC power supply 2 is 200 V, the peak value of the voltage on the inlet side of the driving device 1 reaches approximately 400 V.

When the voltage on the side of the driving device 1 resonates as described above, other electric components such as a fan motor receiving power supply from the AC power supply 2 in the heat pump device are destroyed and other components connected to the same AC power supply 2 are adversely affected.

Thus, when resonance occurs in the voltage detected by the voltage detector 36, the stop controller 43 of the controller 15 immediately stops the operation of the converter 11 and the inverter 13.

Figure 4:
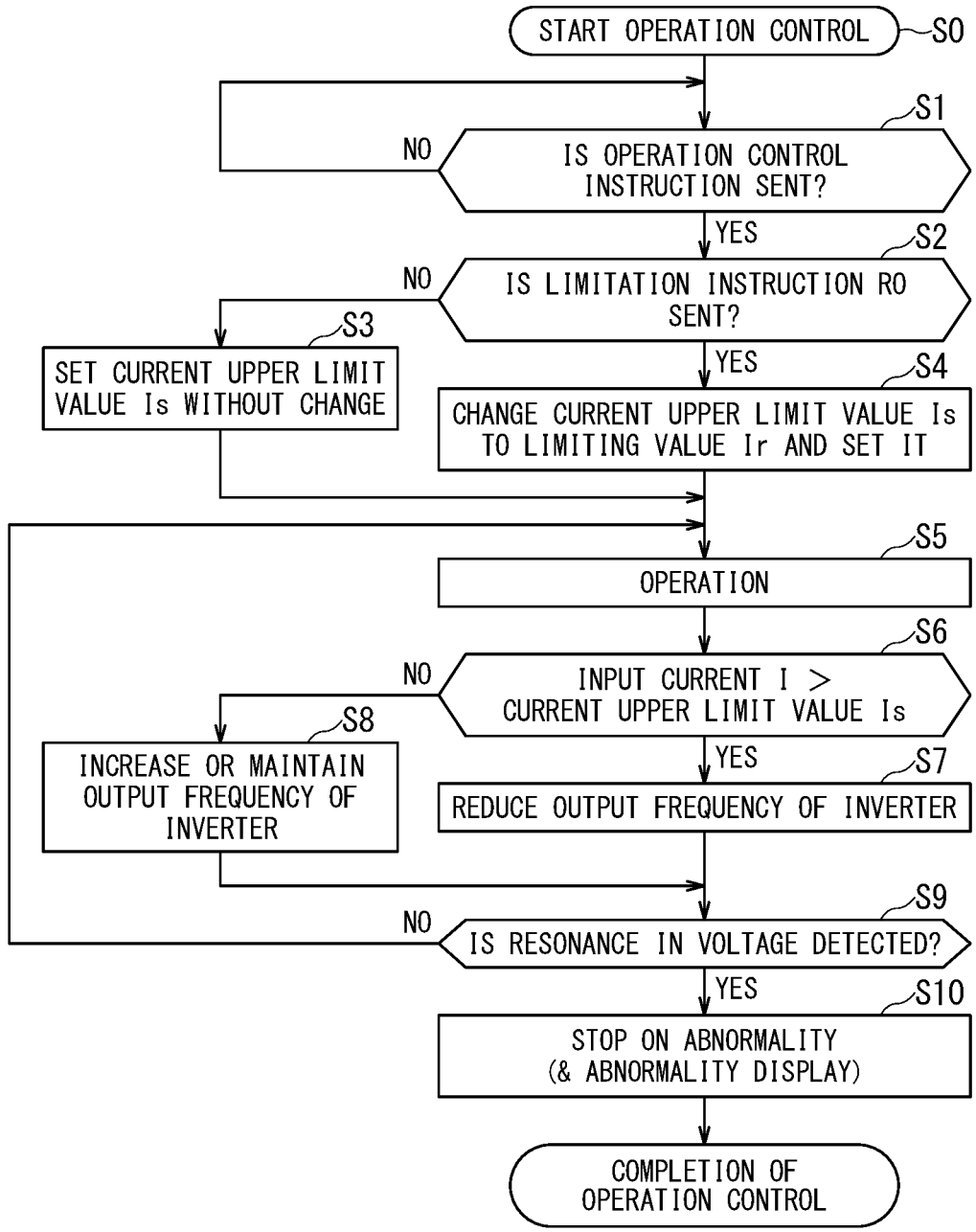
FIG. 4 is a flowchart of operation control in the heat pump device according to the first embodiment of the present invention.

FIG. 4 is a flowchart of operation control in the heat pump device according to the first embodiment of the present invention.

As shown in FIG. 4, the controller 15 of the driving device 1 according to the present embodiment monitors the operation control instruction sent from the controller of the heat pump device (NO in the step S1). When the controller 15 receives the operation control instruction from the controller of the heat pump device (YES in the step S1), the controller 15 determines in the step S2 whether the limitation instruction RO has been sent from the input interface 46.

When the limitation instruction RO is not sent from the input interface 46 (No in the step S2), the controller 15 does not change the current upper limit value Is received from the controller of the heat pump device and directly sets the received current upper limit value Is as the current upper limit value Is of the input current I in the step S3.

When the limitation instruction RO is sent from the input interface 46 (Yes in the step S2), the controller 15 changes the current upper limit value Is received from the controller of the heat pump device to the limiting value Ir, and sets the changed current upper limit value Is as the upper limit value of the input current I in the step S4, that is, the limiting value Ir is set to the upper limit value of the input current I. After this processing, resonance of the power supply voltage does not occur.

Next, the controller 15 drives the driving device 1 in the step S5. Specifically, the converter controller 41 operates the converter 11 in the step S5, and the inverter controller 42 operates the converter 11 such that the rotation speed of the motor 6 is brought closest to the target rotation speed within the range where the input current I is within the current upper limit value Is (from the steps S5 to S8). That is, when the limitation instruction RO is not sent from the input interface 46 (No in the step S2), the inverter controller 42 operates the inverter 13 such that the motor 6 operates at the maximum rotation speed that does not exceed the current upper limit value Is (allowable maximum current) received from the controller of the heat pump device. In this case, since the allowable maximum current is set, the inverter 13 is operable in the entire operation range and the motor 6 is operated at the target rotation speed.

Conversely, when the limitation instruction RO is sent from the input interface 46 (Yes in the step S2), the inverter controller 42 operates the inverter 13 such that the rotation speed is brought closest to the target rotation speed within the range of the current upper limit value Is (=limiting value Ir) changed to the limiting value Ir.

As a specific operation, when the detection result of the current detector 35, i.e., the output current (direct current I) of the converter 11 is larger than the current upper limit value Is (Yes in the step S6), the inverter controller 42 reduces the output frequency of the inverter 13 in the step S7. When the detection result of the current detector 35 is smaller than the current upper limit value Is (No in the step S6), the inverter controller 42 maintains or increases the output frequency of the inverter 13 such that the output frequency does not exceed the target rotation speed, in the step S8.

Although the heat pump device according to the present embodiment controls the output frequency such that the input current of the inverter does not exceed a predetermined value by the inverter controller 42 in the steps S6 to S8, instead of the steps S6 to S8, the output frequency of the inverter 13 may be adjusted by adjusting the non-illustrated valve of the heat pump device to increase or decrease the load (motor 6).

Thereafter, the stop controller 43 of the controller 15 determines in the step S9 whether resonance occurs in the voltage detected by the voltage detector 36 while the converter 11 and the inverter 13 are in operation (in the steps S5 to S8).

When resonance does not occur in the voltage detected by the voltage detector 36, i.e., when the voltage is normal (No in the step S9), the stop controller 43 returns to the step S5 and continues the operation of the converter 11 and the inverter 13 (in the steps S5 to S8).

When it is detected that resonance is occurring in the voltage detected by the voltage detector 36 (Yes in the step S9), the stop controller 43 stops the converter 11 and the inverter 13 and then causes the non-illustrated display of the remote controller 51 and the non-illustrated display of the controller of the heat pump device to display that the operation of the converter 11 and the inverter 13 is stopped due to occurrence of resonance so as to terminate the operation control in the step S10. After the current upper limit value Is is changed to the limiting value Ir as described above, problematic large resonance does not occur, so the determination in the step S9 is always "No". Thus, in the case where the setting of the limiting value Ir is appropriate, it is determined as YES in the step S9 only when the current upper limit value Is remains the initial allowable maximum current value.

A user of the heat pump device, a service person, or a facility worker know that the converter 11 and the inverter 13 have stopped due to the resonance of the voltage from the indication (abnormality display) of the display, and considers improvement of the power supply impedance causing the resonance of the power supply voltage. As a result of consideration, when it is difficult to improve the power supply impedance and the user wishes to restart the heat pump device, the user or the like performs a special operation with respect to the remote controller 51 of the heat pump device or manipulates the changeover switch 52 on the control board to issue the limitation instruction RO to the limitation controller 45.

Thereafter, when the operation is instructed by the remote controller 51, the determination in the step S2 becomes YES, and the current upper limit value Is is changed to the limiting value Ir in the step S4. Since the current flowing in the driving device 1 is limited to a small value, resonance of the power supply voltage no longer occurs afterward, and operation can be continued.

As described above, the driving device 1 of the heat pump device according to the first embodiment is equipped with an operation control incorporating a protection control for stopping the operation of the converter 11 and the inverter 13 when resonance occurs in the voltage. Consequently, even if resonance occurs in the voltage, the driving apparatus 1 of the heat pump device according to the first embodiment can avoid malfunction of the controller of the heat pump device and damage to the components of the controller and reduce influence on other devices than the heat pump device connected to the AC power supply 2.

Furthermore, the driving device 1 of the heat pump device according to the first embodiment can perform protection control for reducing the current upper limit value Is of the inverter 13 by performing special operation on the remote controller 51 of the heat pump device and/or operating the changeover switch 52, and thus can restart the normal operation in which resonance of the power supply voltage does not occur without connecting a separate external device or the like to the heat pump device.

Next, the resonance determination control of the voltage by the stop controller 43 will be described. The resonance determination control is performed in the step S9 in FIG. 4.

Figure 5:
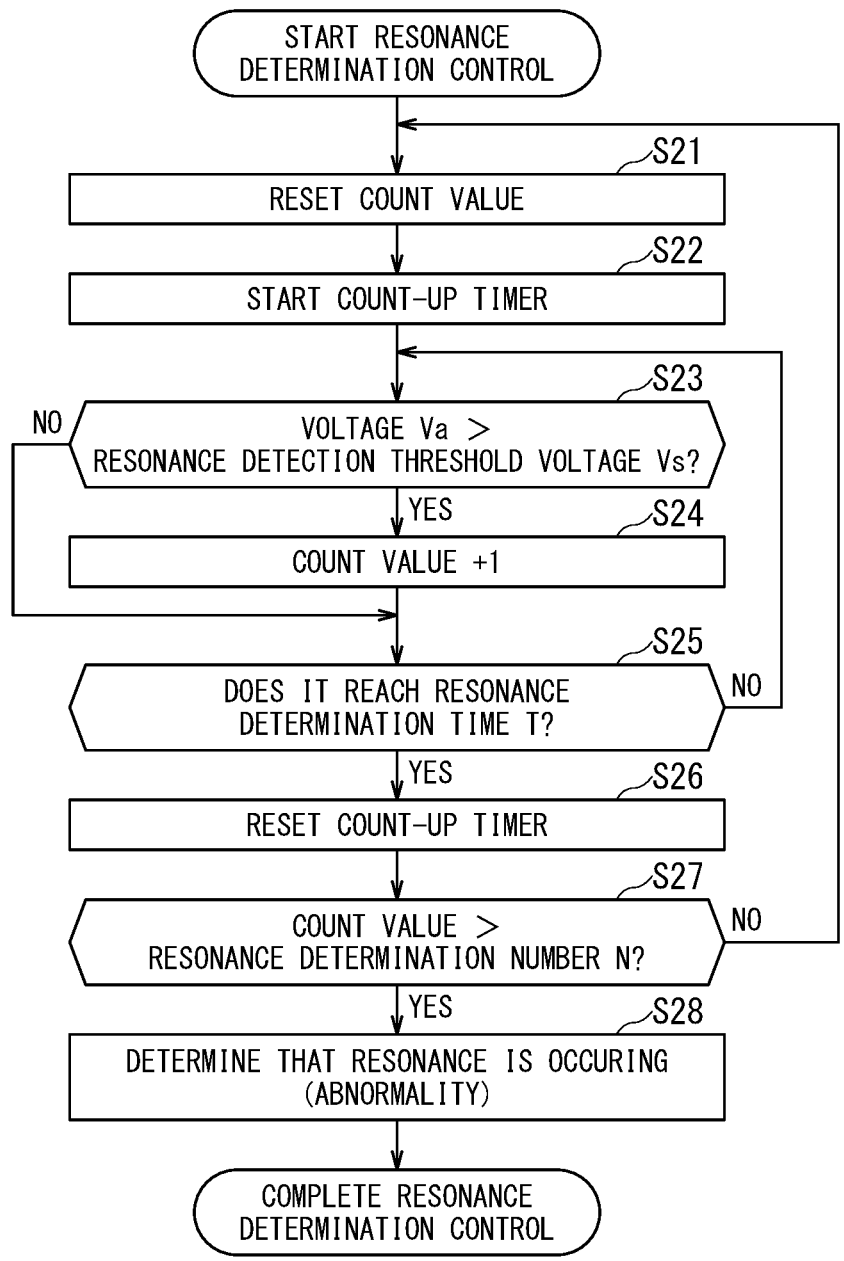
FIG. 5 is a flowchart of resonance determination control in the heat pump device according to the first embodiment of the present invention.

FIG. 5 is a flowchart of the resonance determination control in the heat pump device according to the first embodiment of the present invention.

Figure 6:
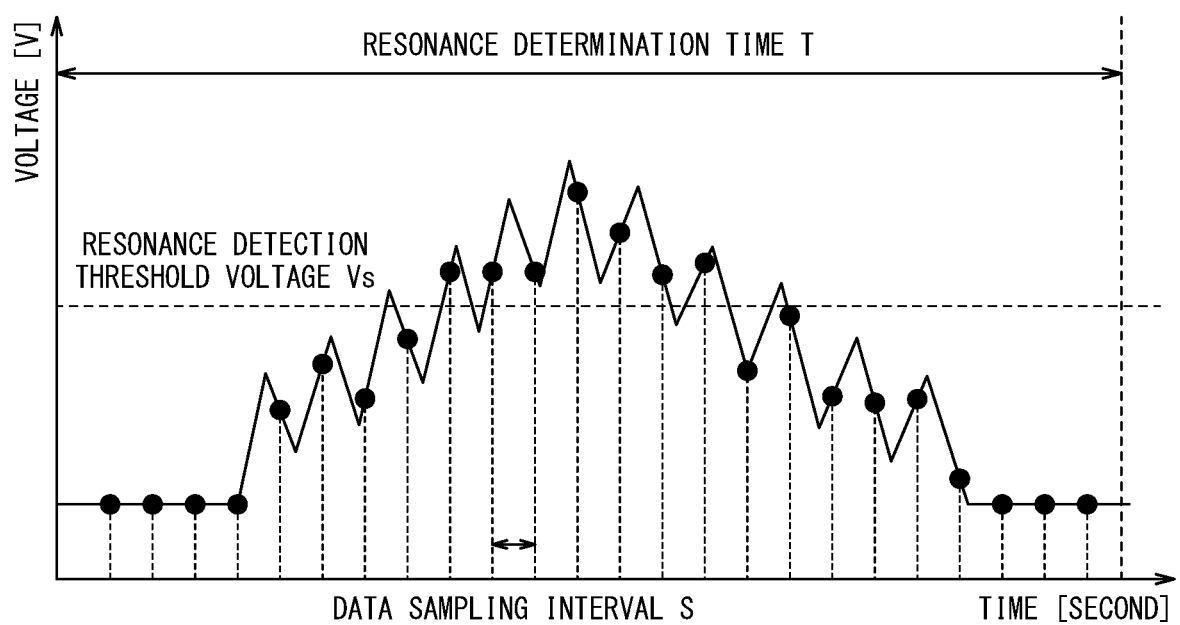
FIG. 6 is a diagram illustrating a concept of the resonance determination control in the heat pump device according to the first embodiment of the present invention.

FIG. 6 is a diagram illustrating the concept of resonance determination control in the heat pump device according to the first embodiment of the present invention.

As shown in FIG. 5 and FIG. 6, the stop controller 43 of the driving device 1 according to the present embodiment resets the counter (to zero) when starting the resonance determination control in the step S21, and starts the count-up timer in the step S22. The count-up timer is used for timing processing for determining the elapse of the resonance determination time T.

Next, the stop controller 43 compares the voltage Va detected by the voltage detector 36 with the resonance detection threshold voltage Vs in the step S23. When the voltage Va detected by the voltage detector 36 exceeds the resonance detection threshold voltage Vs (Yes in the step S23), the stop controller 43 adds "1 value" to the counter in the step S24. When the voltage Va detected by the voltage detector 36 does not exceed the resonance detection threshold voltage Vs (No in the step S23), i.e., when the voltage Va is equal to or lower than the resonance detection threshold voltage Vs, the stop controller 43 bypasses the addition processing of the counter (step S24).

Next, the stop controller 43 determines in the step S25 whether the count-up timer has reached the resonance determination time T. The stop controller 43 repeats the steps S23 and S24 until the count-up timer reaches the resonance determination time T (No in the step S25). When the count-up timer reaches the resonance determination time T (Yes in the step S25), the stop controller 43 initializes the count-up timer and returns it to zero in the step S26.

When a count value of the counter is smaller than a predetermined resonance determination number N (No in the step S27), the stop controller 43 returns to the step S21 so as to continue the resonance determination control. Conversely, when the count value of the counter is equal to or larger than the predetermined resonance determination number N (Yes in the step S27), the stop controller 43 determines in the step S28 that resonance is occurring.

The resonance determination time T is determined according to, e.g., the power supply cycle such that the peak voltage can be captured.

The data sampling interval S is considerably shorter than the resonance determination time T and is determined such that plural data can be acquired before and after the peak voltage.

The resonance detection threshold voltage Vs is set to such an extent that the resonance phenomenon of the voltage detected by the voltage detector 36 can be caught, for instance, about 1.5 times to 1.8 times the peak voltage at non-resonance (normal time).

The resonance determination number N is an integer which is 1 or more and is smaller than T/S (i.e., the value obtained by dividing the resonance determination time T by the data sampling interval S), and is appropriately determined.

Second Embodiment

Next, the heat pump device according to a second embodiment of the present invention will be described with reference to FIG. 7 and FIG. 8. In this embodiment, an operation prohibition controller 55 is added to the limitation controller 45 of the first embodiment.

Figure 7:
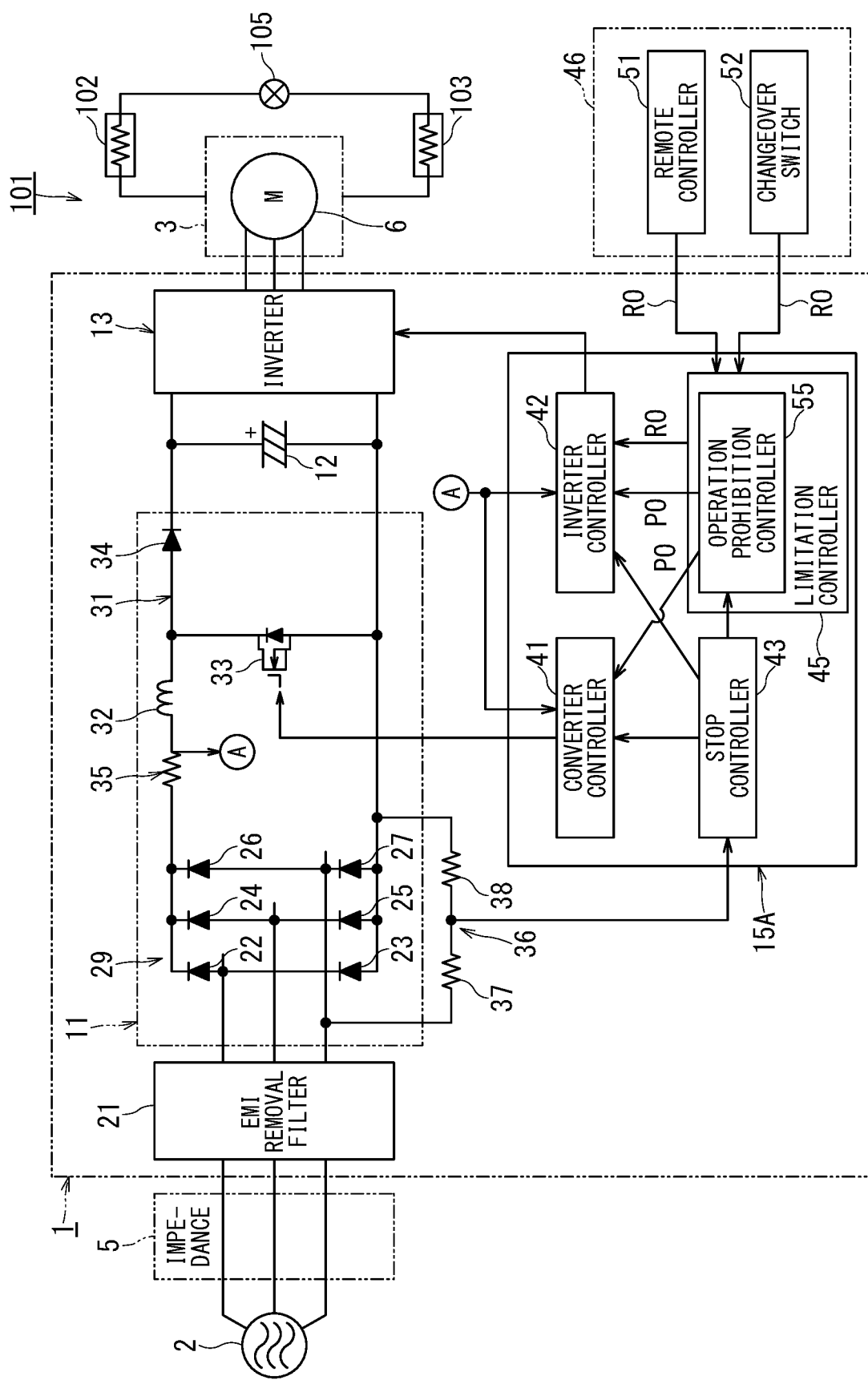
FIG. 7 is a circuit diagram and control block diagram of the heat pump device according to a second embodiment of the present invention.

FIG. 7 is a circuit diagram and control block diagram of the heat pump device according to the second embodiment of the present invention.

In the heat pump device according to the present embodiment, the same components as those of the heat pump device of the first embodiment are denoted by the same reference signs, and duplicate description is omitted.

As shown in FIG. 7, the controller 15A of the driving device 1 according to the embodiment includes the operation prohibition controller 55 that prohibits re-operation of the converter 11 and the inverter 13 until receiving the limitation instruction RO after the stop controller 43 stops the operation of the converter 11 and the inverter 13.

The operation prohibition controller 55 is connected such that receives inputs from the stop controller 43 and the input interface 46 and outputs to the inverter controller 42 and the converter controller 41. The operation prohibition controller 55 sends an operation prohibition instruction PO to each of the converter controller 41 and the inverter controller 42 so as to prohibit re-operation of the converter 11 and the inverter 13 until the limitation controller 45 receives the limitation instruction RO from the input interface 46 after the stop controller 43 stops the operation of the converter 11 and the inverter 13 due to occurrence of resonance. Accordingly, in the case where the converter 11 and the inverter 13 are stopped due to occurrence of resonance in the voltage detected by the voltage detector 36, the heat pump device according to the present embodiment cannot resume operation until the limitation instruction RO is sent even when the operation of the heat pump device is instructed by the remote controller 51.

When the limitation controller 45 receives the limitation instruction RO from the input interface 46, the operation prohibition controller 55 stops the transmission of the operation prohibition instruction PO and permits re-operation of the converter 11 and the inverter 13. In addition, the limitation controller 45 supplies the limitation instruction RO to the inverter controller 42 in order to limit the input to the converter 11 and thereby avoid resonance of the voltage detected by the voltage detector 36. In other words, the operation prohibition controller 55 is a function added to the limitation controller 45, and is a function of prohibiting the operation and permitting the re-operation of the converter 11 and the inverter 13.

Figure 8:
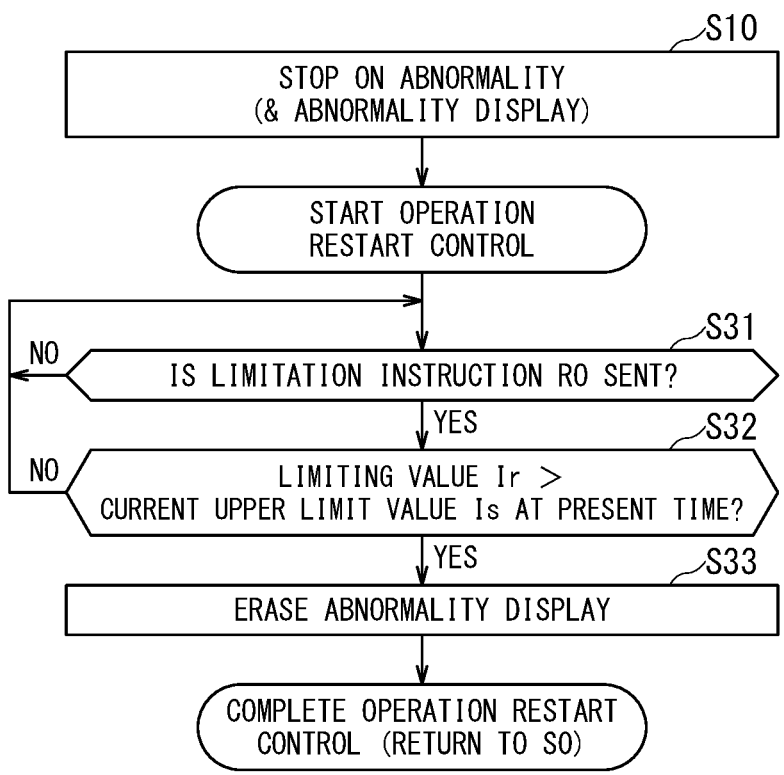
FIG. 8 is a flowchart of operation restart control of the heat pump device according to the second embodiment of the present invention.

FIG. 8 is a flowchart of the operation restart control after the stop due to resonance detection by the heat pump device according to the embodiment of the present invention.

As shown in FIG. 8, the operation prohibition controller 55 of the driving device 1 according to the present embodiment determines in the step S31 whether the limitation instruction RO is sent from the input interface 46.

When the limitation instruction RO is not sent from the input interface 46 (No in the step S31), the operation prohibition controller 55 continues to wait the limitation instruction RO without permitting the re-operation of the converter 11 and the inverter 13 while maintaining the stopped state of the converter 11 and the inverter 13.

When the limitation instruction RO is sent from the input interface 46 (Yes in the step S31), the operation prohibition controller 55 compares the current upper limit value Is being set in the inverter controller 42 with the limiting value Ir in the step S32.

When the limiting value Ir is smaller than the current upper limit value Is (Yes in the step S32), the operation prohibition controller 55 erases the display (abnormality display) on the display in the step S33 and returns to the operation control in FIG. 4. In this case, since the current upper limit value Is is limited to the limiting value Ir that can avoid resonance, problematic large resonance does not occur after that.

When the limiting value Ir is equal to or larger than the current upper limit value Is, i.e., when there is no instruction to change the limit value (No in the step S32), the operation prohibition controller 55 returns to the step S31 and continues to wait the limitation instruction RO without permitting the re-operation of the converter 11 and the inverter 13 while maintaining the stopped state of the converter 11 and the inverter 13, until receiving an appropriate limiting value Ir. Accordingly, once the occurrence of resonance is detected, the re-operation cannot be executed as long as a user or the like operates the input interface 46 and inputs the limiting value Ir, and thus the occurrence of resonance is minimized as much as possible.

The heat pump device according to the second embodiment prevents the occurrence of resonance as much as possible by adding the control to prohibit the re-operation of the converter 11 and the inverter 13 until the limitation instruction RO is received after stopping the operation of the converter 11 and the inverter 13.

According to the heat pump device of the present embodiment as described above, it is possible to reduce the increase in the number of component, installation space, and cost and to perform such an operation that resonance of the power supply is avoided.

In the above-described embodiments, the output frequency of the inverter 13 is controlled so that the input current of the converter 11 becomes equal to or less than the limit value by the limitation instruction RO. However, the input power to the converter 11 may be set to be equal to or less than the limit value, provided that the rated voltage of the commercial power source 2 is constant.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

REFERENCE SIGNS 1 driving device
2 AC power supply
3 compressor
5 impedance
6 DC motor
11 converter
12 smoothing capacitor
13 inverter
15, 15A controller
21 EMI removal filter
22 to 27 diode
29 rectification circuit
31 boost chopper circuit
32 reactor
33 switching element
34 chopper diode
35 current detector
36 voltage detector
37 resistor
41 converter controller
42 inverter controller
43 stop controller
45 limitation controller
46 input interface
51 remote controller
52 changeover switch
55 operation prohibition controller

The invention claimed is:

1. A heat pump device comprising:
a compressor configured to compress a refrigerant;
a converter configured to convert a voltage of an alternating current power supply into a direct current voltage boosted by switching;
an inverter configured to convert the direct current output of the converter into an alternating current power supply and supply the alternating current power supply to the compressor;
a voltage detector configured to detect an input voltage of the converter;
a stop controller configured to stop operation of the converter and the inverter in response to resonance occurring in the input voltage being detected by the voltage detector;
a limitation controller configured to send an instruction to limit an input current to the converter in such a manner that resonance is avoided; and
an input interface configured to be manually operable and input an operational instruction to operate the limitation controller.

2. The heat pump device according to claim 1, wherein the input interface is at least one of:
a remote controller of the heat pump device that is equipped with plural buttons and is configured to input the operational instruction to the limitation controller when a special operation is performed on the plural buttons, and
a changeover switch that is provided in a controller of the heat pump device, the changeover switch having a first switching state and a second switching state and being configured so that the operation instruction is input to the limit control unit in response to the changeover switch being placed in the first switching state and the operation instruction is prevented from being input to the limit control unit in response to the changeover switch being placed in the second switching state.

3. The heat pump device according to claim 1, further comprising an operation prohibition controller configured to stop re-operation of the converter and the inverter until receiving the operational instruction, after the stop controller stops operation of the converter and the inverter.

4. The heat pump device according to claim 1, further comprising an inverter controller configured to control an output frequency so that an input current of the inverter does not exceed a predetermined value when receiving the instruction to limit the input current to the converter and limit the input current to the converter in such a manner that resonance is avoided.

5. The heat pump device according to claim 2, further comprising an operation prohibition controller configured to stop re-operation of the converter and the inverter until receiving the operational instruction, after the stop controller stops operation of the converter and the inverter.

6. The heat pump device according to claim 2, further comprising an inverter controller configured to control an output frequency so that an input current of the inverter does not exceed a predetermined value when receiving the instruction to limit the input current to the converter and limit the input current to the converter in such a manner that resonance is avoided.

7. The heat pump device according to claim 3, further comprising an inverter controller configured to control an output frequency so that an input current of the inverter does not exceed a predetermined value when receiving the instruction to limit the input current to the converter and limit the input current to the converter in such a manner that resonance is avoided.

* * * * *